J. PUTNAM.
CAR-STARTER.

No. 175,162.  Patented March 21, 1876.

WITNESSES:

John Putnam
INVENTOR.

J. McC. Perkin
ATTORNEY.

Putman

J. PUTNAM.
CAR-STARTER.

No. 175,162.   2 Sheets—Sheet 2.

Patented March 21, 1876.

WITNESSES:
D. P. Cowl
H. T. Wiswall

John Putnam
INVENTOR.

J. McC. Perkins
ATTORNEY.

*Corrected by order of Commissioner Dec. 12, 1876*

UNITED STATES PATENT OFFICE.

JOHN ~~PUTNAM~~ *Putman*, OF RUSHVILLE, ILLINOIS.

IMPROVEMENT IN CAR-STARTERS.

Specification forming part of Letters Patent No. 175,162, dated March 21, 1876; application filed February 19, 1876.

*To all whom it may concern:*

Be it known that I, JOHN ~~PUTNAM~~ *Putman*, of Rushville, in the county of Schuyler and State of Illinois, have invented certain new and useful Improvements in Draw-Bars for Starting Railway-Cars; and I do hereby declare that the following is a full, clear, and exact description thereof, that will enable others skilled in the art to which it appertains to make and use the same, reference being had to the accompanying drawings, and to the letters and figures of reference marked thereon, which form a part of this specification.

The same letters and figures of reference are used to indicate the corresponding parts.

After describing the invention, its nature and extent will be shown in the claims.

My invention relates to improvements in starting trains of railway-cars by means of a draw-bar attached beneath the floor of the tender to the engine, and connected by suitable gearing to a small stationary engine on the top of the tender.

Figure 1:
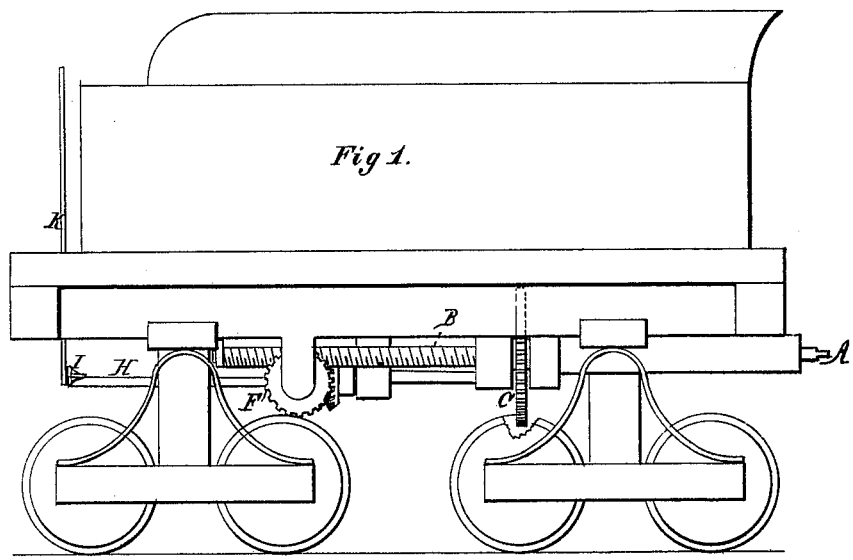
Figure 2:
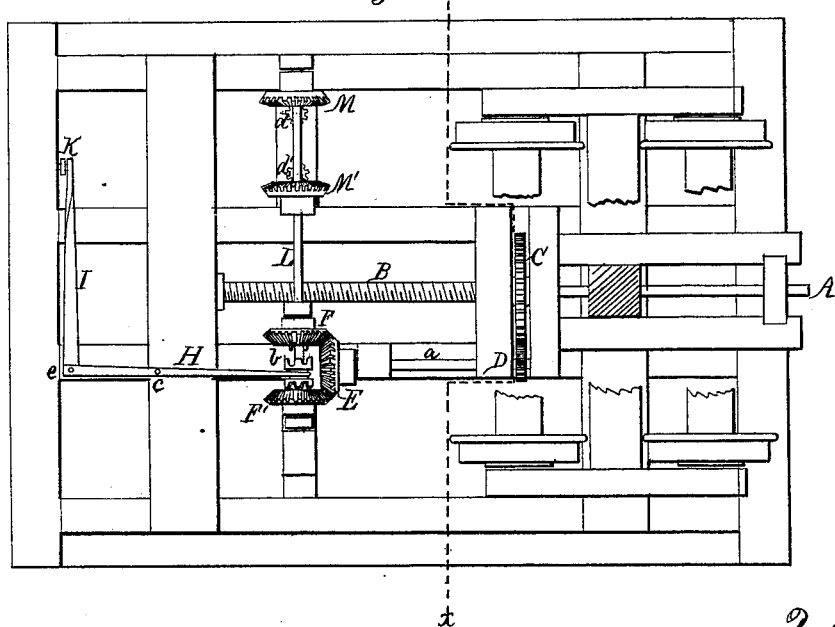
Figure 3:
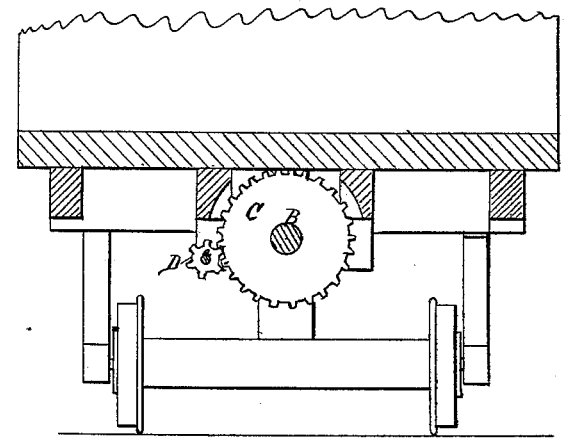
Figure 4:
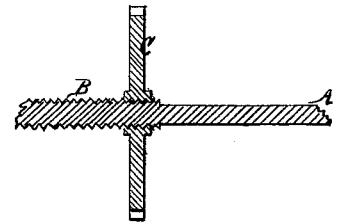

Figure 1 is a side view of the tender with my invention attached thereto. Fig. 2 is a plan view of the bottom of the tender, showing the relative arrangement of the draw-bar and connected gearing. Figs. 3 and 4 are detail views.

A is the end of the draw-bar to be attached to the train of cars. B is the inner part of the draw-bar, on which is made a male screw, commencing just before it passes through the cog-wheel C. The draw-bar acts as an axle to the wheel C, whose center is provided with a female screw, so that the revolution of the wheel C extends or contracts the draw-bar A according to the way it revolves.

The pinion D engages with the wheel C. The shaft a connects the pinion D with the bevel-wheel E. The wheel E gears with the wheels F and F'.

The shaft L connects the bevel-wheels F and F' with the bevel-wheels M and M'. The pinions d and d' engage the wheels M and M' and move on shafts which pass up and through the tender and receive the power from the stationary engine on the top of the tender.

The movable clutch b slides on the shaft L between the two wheels F and F', which two wheels are not fixed to but movable on the shaft L. The lever H is pivoted at the point C and is jointed to the arm I at the point e. At the point K, at one end of the arm I, there is a vibrating lever, which rises perpendicularly to the top of the tender where it can be manipulated. This upright lever is moved to the right or left hand, causing the clutch b to engage with the wheel F or F' accordingly as the train of cars may be desired to move forward or backward on the track.

The operation of my invention to move the train of cars either forward or backward is now apparent.

The power from the small stationary engine on the top of the tender is communicated to the shafts of the pinions d d', and thence, by gearing heretofore described, necessarily to M M' and F F', or, as may be desired, thence to wheel E, and pinion D, and to wheel C, the revolutions of which shorten or lengthen the draw-bar A, as heretofore explained.

Having now fully described my invention, and its mode of operation, what I claim as new, and desire to secure by Letters Patent, is—

1. In a car-starter for railways, the draw-bar A and the wheel C in combination with the pinion D, and the shaft a and the wheel E, substantially as described, and for the purposes specified.

2. The draw-bar A, wheel C, pinion D, shaft a, and wheel E in combination with the wheels F F', shaft L, wheel M, and pinion d, as shown and described, and for the purposes specified.

3. The lever I, pivoted lever H, clutch h, wheels F F', in combination with the wheel E, shaft a, pinion D, wheel C, and draw-bar A, substantially as shown and described, and for the purposes set forth.

4. The draw-bar A, wheel C, pinion D, shaft a, and wheel E in combination with wheels F F', shaft L, wheels M M', and pinions d d,' substantially as described, and for the purposes specified.

In testimony that I claim the foregoing I have hereunto set my hand this sixth day of October, 1876.

JOHN ~~PUTNAM~~ *Putman*.

Witnesses:
  EDWARD P. VAIL,
  EDGAR ANDERSON.